April 22, 1930.  R. A. KOTTKE  1,755,654

HOLDER FOR PANS AND COVERS

Filed Feb. 25, 1929

INVENTOR
Rudolph A. Kottke.

BY

J. J. Murray

ATTORNEY

Patented Apr. 22, 1930

1,755,654

UNITED STATES PATENT OFFICE

RUDOLPH A. KOTTKE, OF DETROIT, MICHIGAN

HOLDER FOR PANS AND COVERS

Application filed February 25, 1929. Serial No. 342,404.

This invention relates to kitchen accessories, and particularly to racks for holding bake pans, pan covers, and similar members.

An object of the invention is to provide a rack for the aforesaid purpose, that may be simply and readily adjusted for holding different sizes of pans and covers, that may be inexpensively formed of wire, and that will be adequately strong to safely sustain a considerable weight.

Another object is to form such a rack of two relatively adjustable wire members, each comprising two or more bottom supports for a pan or cover, and also a lateral pan-retaining arm.

These and various other objects the invention attains by the construction hereinafter described and illustrated in the accompanying drawings, wherein.

Figure 1:
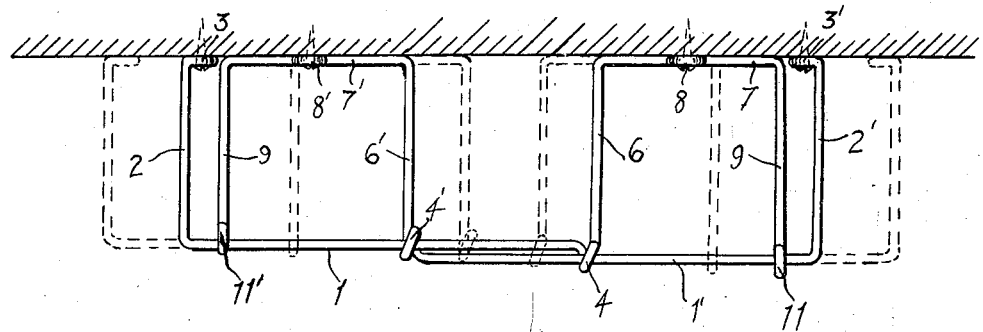
Figure 1 is a top plan view of a rack embodying the invention, showing in full and in dash lines two positions thereof.
Figure 2:
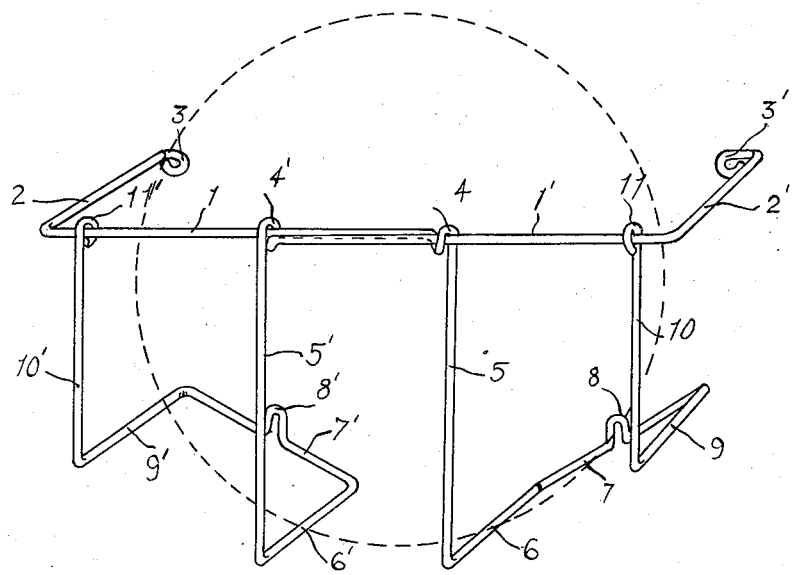
Figure 2 is a front view thereof.

In these views the reference characters 1 and 1' designate two lengths of wire, slidably interengaged to afford a considerable variation in their joint length. The remote end portions of said lengths are rearwardly bent at right angles forming a pair of arms 2 and 2', the rear ends of which are bent toward each other, forming eyes 3 and 3', engageable by screws or the like fastening the rack to some suitable support, as a door of a kitchen cabinet.

The adjacent ends of the lengths, 1 and 1', are looped to mount each length slidingly on the other, as indicated at 4 and 4', and supports 5 and 5' are downwardly and integrally extended from said loops. These, at their lower ends are similarly bent rearwardly, as indicated at 6 and 6' and are then extended from each other at an upward inclination, as indicated at 7 and 7', the members 7 and 7' being formed with screw-receiving offsets 8 and 8', at their mid-points. Arms 9 and 9' are extended forwardly from the remote ends of the members 7 and 7' and have their forward ends upwardly bent to form vertical supports 10 and 10', forming loops 11 and 11' at their upper ends to engage the members 1 and 1'.

The construction thus consists of slidably connected units, each having a horizontal top member 1 and 1', each of which integrally carries a pair of spaced vertical supports 5 and 10, and 5' and 10', the lower ends of said supports being connected by U-shaped pan seats 6, 7, 8, 9, and 6', 7', 8', and 9', guide loops being formed upon each unit to engage the top length of wire of the other unit, whereby the depending supports may be slid to and from each other, at the same time causing a reverse adjustment of the arms 2, 2' relative to each other. Thus, in increasing the spaced relation of the arms 2, 2', the supports 5, 6, 7, 8, 9 and 5', 6', 7', 8', 9', are brought toward each other, and said supports are shifted apart in bringing said arms 2 and 2' toward each other.

The described construction is one that may be easily adjusted to accommodate any desired standard size of pans or covers.

The provision of the four supporting arms 6, 6' and 9, 9' for engagement by the bottoms of the pans or covers adapts the device to safely carry considerable weight.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

What I claim is:

1. A rack comprising a pair of complementary wire members, each comprising two spaced vertical members forming the front of the rack and each further comprising a U-shaped connection between the lower ends of the vertical members projecting rearwardly therefrom, and forming the rack bottom.

2. A rack comprising a pair of complementary wire members, each comprising two spaced vertical members forming the front of said rack and integrally connected at their lower ends by rearwardly projecting U-shaped members forming the rack bottom and fashioned in their rear-most portions for engagement by fasteners for mounting the rack.

3. A rack comprising a pair of complementary wire members, each consisting of a pair of spaced vertical members forming the front of the rack, and a U-shaped member forming the bottom of the rack integrally connecting the lower ends of said vertical members, the adjacent sides of the two U-shaped bottom-forming members being at the same level and the remote sides of said members being at a higher level.

4. A rack comprising a pair of complementary wire units, each consisting of a pair of vertical lengths of wire forming the front of the rack, and a U-shaped rearwardly extending projection between the lower ends of said lengths forming the bottom of the rack, horizontal lengths of wire being extended from the adjacent vertical members of the two units and projecting oppositely therefrom in overlapping relation, and being formed with retaining and supporting arms rearwardly projecting therefrom at opposite sides of said vertical members.

5. A rack comprising a pair of complementary wire units, each consisting of slidably engaged overlapping lengths of wire arranged at the front and top of the rack, the remote ends of said lengths being rearwardly bent to form supporting arms, each of said lengths of wire being formed with a depending member rearwardly bent to form a bottom for the rack, the depending member of each unit being arranged between the depending member of the other unit and the rearwardly projecting arm of the other unit.

6. A rack comprising a pair of complementary wire units, each comprising two lengths of wire slidably interengaging, the remote ends of said lengths being formed with rearwardly projecting supporting arms, and the other end of each length being integrally bent to form spaced vertical members at the front of the rack, and a U-shaped integral connection therebetween forming the rack bottom.

7. A rack comprising two complementary wire units, each consisting of two lengths of wire having overlapping portions, the remote ends of said lengths being rearwardly bent to form supporting arms, the other ends of each of said lengths integrally carrying a pair of spaced vertical members looped at their upper ends to form guides for the other of said lengths, and being connected at their lower ends by U-shaped members rearwardly projecting to form the rack bottom.

8. A rack comprising an elongated portion at the top and front of the rack having rearwardly bent supporting end portions forming sides of the rack, two pairs of front-forming members depending from said horizontal portion and spaced longitudinally thereof, and two substantially U-shaped bottom-forming members respectively connecting the lower ends of the depending members of each of said pairs and rearwardly projecting therefrom.

9. A rack comprising a pair of slidably engaged elongated members arranged at the top and front of the rack and having their remote ends rearwardly bent to form supporting sides for the rack, a front-forming member depending from each of said slidably engaged members, said front-forming member of each unit being arranged between the front-forming member of the other unit and the rearwardly projecting arm of the other unit, and a bottom-forming member rearwardly projecting from the lower end of each depending front-forming member.

In testimony whereof I sign this specification.

RUDOLPH A. KOTTKE.